Jan. 23, 1945.    B. BAXTER ET AL    2,367,662
PRESSURE SHOCK ABSORBER FOR WELDING SYSTEMS
Filed Feb. 22, 1943
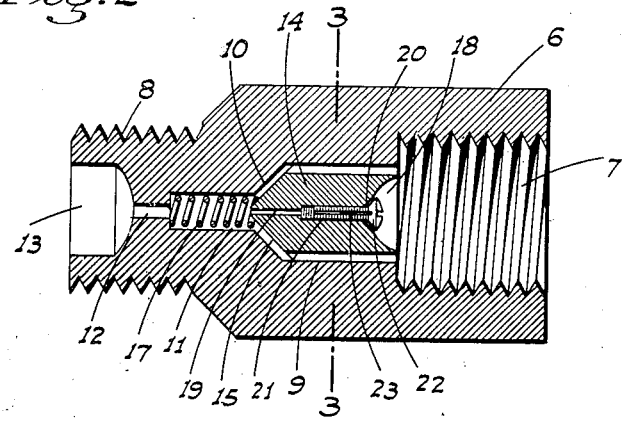
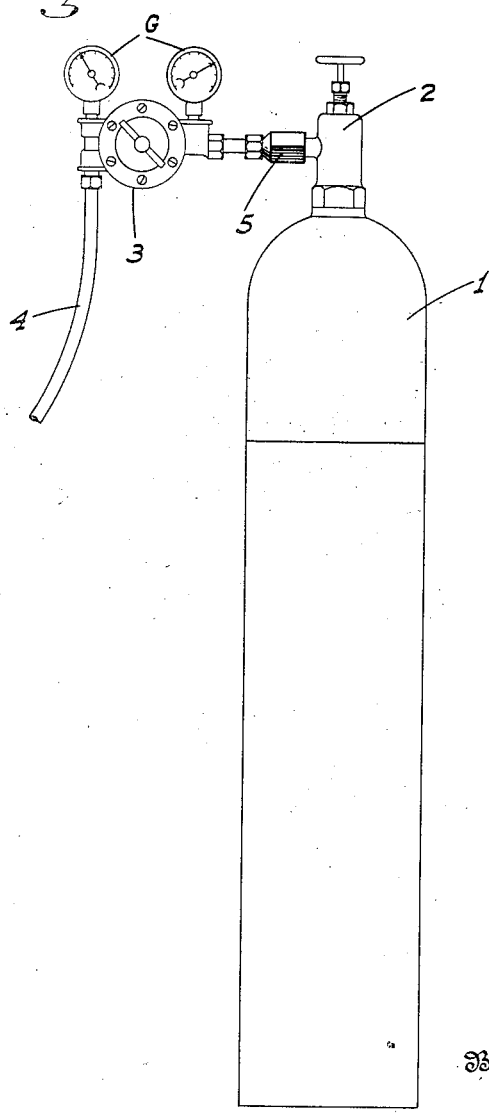
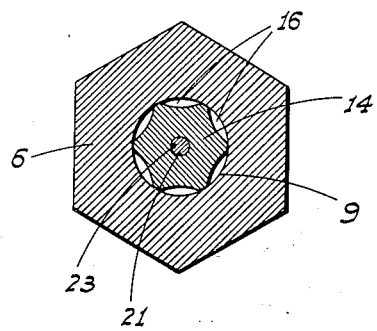
Inventor
Ben Baxter
S. M. Kandarian
By Webster & Webster
Attorneys Patented Jan. 23, 1945

2,367,662

UNITED STATES PATENT OFFICE 2,367,662

PRESSURE SHOCK ABSORBER FOR WELDING SYSTEMS

Benjamin Baxter and Samuel M. Kandarian, Fowler, Calif.

Application February 22, 1943, Serial No. 476,740

3 Claims. (Cl. 137—152)

This invention relates in general to an improved safety device for use in connection with gas type welding systems, and in particular the invention is directed to a pressure shock absorber for this type of welding system.

Gas welding systems conventionally include a tank of oxygen or other gas at extremely high pressure; there being a manually controlled regulator or pressure reduction valve connected between the manually actuated tank valve and the torch supply hose. At present when the tank valve is opened by the operator extreme caution must be observed and such tank valve opened slowly, otherwise a sudden rush of high pressure will surge from the tank into the regulator unit with probable damage to the same and to the gauges thereon, or damage to other parts of the welding system beyond the tank valve. In some cases such sudden surge of pressure has been known to burst the regulator, resulting in serious injury to the operator.

It is therefore an object of the present invention to provide a pressure shock absorber arranged to be connected in series between the high pressure gas tank and the pressure regulator of a welding system; said pressure shock absorber including a self-equalizing shock absorbing or check valve which is normally open for free gas flow thereby, but is operative to close and cushion the sudden initial surge of pressure from the high pressure gas tank when the tank valve is turned on; said pressure shock absorbing valve after functioning to cushion a surge of pressure, thereafter and automatically returning to open position so that gas may flow freely therepast during the subsequent welding operation.

An additional object of the invention is to provide a pressure shock absorber for welding systems, as in the preceding paragraph, in which the shock absorber comprises a body formed with attachment fittings at opposite ends, said body between said fittings being bored lengthwise, a portion of the bore being of enlarged diameter for the reception in sliding relation of a tapered plug valve, one end of said portion of the bore being formed as a taper seat against which the taper plug valve is adapted to matchingly engage with travel of the valve in the direction of gas flow, a spring normally holding the valve in open position clear of said seat, the valve being fluted longitudinally on the outside to form channels through which the gas normally and freely flows by said valve, and restricted passage means to bleed pressure from one end of the valve to the other, and in bypassing relation to said valve seat, after the valve is closed by a pressure surge, whereby the pressure beyond the valve then gradually increases to the pressure ahead of the valve, whereupon the valve is returned to its normal open position by the spring, and the gas flows freely therepast.

A still further object of this invention is to provide a pressure shock absorber for welding systems, which when in use, makes it unnecessary for the operator to close the regulator valve before the main tank valve is turned on, thus saving wear and tear on the regulator and materially prolonging its life.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawing similar characters of reference indicate corresponding parts in the several views:

Figure 1 is a somewhat diagrammatic elevation of a high pressure gas tank and an attached pressure regulator, the pressure shock absorber being shown connected between the tank valve and said regulator.

Figure 2 is an enlarged longitudinal sectional elevation of the pressure shock absorber.

Figure 3 is a cross section on line 3—3 of Fig. 2.

Referring now more particularly to the characters of reference on the drawing, the numeral I indicates a high pressure gas tank of the type used to supply oxygen or the like to a welding system, said tank including, as is usual, a manually controlled tank valve, indicated at 2. The numeral 3 indicates a conventional hand controlled regulator or pressure reduction valve, including one or more sight gauges G, which valve is conventionally connected between the tank valve 2 and the hose 4 which leads from the regulator to the welding torch (not shown).

Our pressure shock absorber for welding systems is indicated generally at 5, and is shown connected between the tank valve 2 and the regulator 3 by suitable fittings.

The pressure shock absorber 5 comprises in detail, as shown in Figs. 2 and 3, the following:

An elongated body 6 is bored and tapped at one end to form a female fitting 7, and is of reduced diameter and threaded at the other end to form a male fitting 8.

Between the fittings 7 and 8 the body is formed with an internal bore 9 of substantial diameter, the end of said bore adjacent the fitting 8 being shaped as an annular taper seat 10 which communicates with a reduced diameter bore or socket 11 whose opposite end communicates with a smaller diameter longitudinal passage 12 leading to an open end 13 at the male fitting end of the body.

At the end opposite seat 10 the bore 9 is open to the female fitting 7 and a taper plug valve 14 is slidably disposed in said bore, the tapered end 15 of said valve being shaped to matchingly engage taper seat 10. Between the tapered end 15 of valve 14 and its opposite end said valve is fluted on the outside lengthwise to provide a series of circumferentially spaced gas flow channels 16 between the valve and the wall of bore 9.

A helical compression spring 17 is disposed in the socket 11 and engages the tapered end 15 of valve 14, said spring normally holding the valve in open position, i. e. with its tapered end 15 clear of seat 10 whereby gas may normally freely flow from fitting 7 through channels 16, past seat 10, and through socket 11 and passage 12 to the open end 13, from which the gas flows to the regulator 3.

The valve 14 is concave at the end opposite the valve seat, as at 18, and is formed with a central, longitudinal bleed passage 19 which extends therethrough from end to end, said bleed passage being of relatively small diameter. At the concave end of the valve, the bleed passage 19 is enlarged and tapered to form a seat 20. An adjustment screw 21 is threaded into passage 19 from said end of the valve; said screw having a taper head 22 to match seat 20, and being longitudinally grooved full length as at 23, said groove running into the face of said taper head, as shown.

In operation, when the tank valve 2 is opened, the initial surge of pressure from the tank 1 strikes the concave end 18 of valve 14, instantly moving the latter so that end 15 engages seat 10, closing the valve. This prevents the surge of pressure from reaching the regulator.

Thereafter the gas under such high pressure bleeds by the screw head 22, which is adjusted in slightly spaced relation to seat 20, and thence the pressure bleeds along groove 23 and passage 19 into socket 11. When this occurs the pressure beyond the valve 14 gradually increases until it is equal to the high pressure ahead of said valve. As the pressures at opposite ends of the valve begin to equalize, the spring 17 acts to retract the valve 14 from seat 10, whereupon the gas from the tank freely flows by the valve 14, as previously described.

By adjusting the screw 21 the time required for the equalization of the pressure at opposite ends of the valve 14 may be regulated.

By virtue of the above described device damage to regulators, the gauges thereof, and other parts of the welding system is eliminated, together with avoiding the possibility of injury to the operator from exploding regulators, etc. Another advantage of the device is that the operator need not close the regulator valve before opening the tank valve.

While especially designed for use in welding systems, the pressure shock absorber may be used in any fluid pressure system which is subjected at certain times to an initial pressure surge, which if not regulated may produce undesirable results.

As the plug valve is returned to normal position by a spring, and further as gravity plays no part in the operation of the device, the device will operate successfully in any position of use and need not be maintained horizontal, as shown.

From the foregoing description it will be readily seen that we have produced such a device as substantially fulfills the objects of the invention as set forth herein.

While this specification sets forth in detail the present and preferred construction of the device, still in practice such deviations therefrom may be resorted to as do not form a departure from the spirit of the invention, as set forth herein.

Having thus described our invention, what we claim as new and useful and desire to secure by Letters Patent is:

1. A fluid pressure shock absorbing valve unit comprising a body having a bore therethrough, a pressure responsive plug valve slidable in said bore, a seat in the bore against which the valve is adapted to close, yieldable means normally holding the valve open relative to said seat, the valve when open permitting free flow therepast, and restricted passage means to bleed fluid through the valve when the latter is closed, said last named means comprising a bore through the valve, a headed screw threaded in one end portion of the bore, and the screw head and adjacent portion of the valve having cooperating faces, said faces being normally only slightly spaced the screw having an exterior longitudinal groove extending from a point in the face on the head to the opposite end of said screw.

2. A self-equalizing pressure shock absorbing valve comprising a body having a bore therethrough, a pressure responsive plug valve slidable in the bore, an annular tapered valve seat formed in the bore, one end of the valve being tapered to matchingly engage said seat and including a tapered apex portion adapted to project through and slightly beyond said seat, a reduced diameter socket forming portion in the bore beyond the valve seat, and a loaded helical compression spring in the socket, said tapered apex portion of the valve seating in the adjacent end of said spring, the valve having a restricted axial passage therethrough to bleed fluid through said valve when the latter is closed.

3. A self-equalizing pressure shock absorbing valve comprising a body having a bore therethrough, a pressure responsive plug valve slidable in said bore, a seat in the bore against which the valve is adapted to close, yieldable means normally holding the valve open relative to said seat, the valve when open permitting free flow therepast, and restricted passage means to bleed fluid through the valve when the latter is closed, said last named means comprising an axial bore through the valve, the end of the valve opposite said seat being relatively deeply concave, and a headed bleed screw threaded into the adjacent end portion of said bore in the valve, the screw head being disposed wholly within said concavity, and said screw head and adjacent portion of the concavity having closely disposed cooperating faces.

BENJAMIN BAXTER.
SAMUEL M. KANDARIAN.